(12) United States Patent
Lees et al.

(10) Patent No.: US 6,690,820 B2
(45) Date of Patent: Feb. 10, 2004

(54) SYSTEM AND METHOD FOR ANALYZING AND IMAGING AND ENHANCED THREE-DIMENSIONAL VOLUME DATA SET USING ONE OR MORE ATTRIBUTES

(75) Inventors: Jack Lees, Houston, TX (US); Tatum M. Sheffield, Missouri City, TX (US)

(73) Assignee: Magic Earth, Inc., Houston, TX (US)

( * ) Notice: Subject to any disclaimer, the term of this patent is extended or adjusted under 35 U.S.C. 154(b) by 51 days.

(21) Appl. No.: 09/936,780

(22) PCT Filed: Jan. 31, 2001

(86) PCT No.: PCT/US01/03227

§ 371 (c)(1),
(2), (4) Date: Sep. 17, 2001

(87) PCT Pub. No.: WO02/061463

PCT Pub. Date: Aug. 8, 2002

(65) Prior Publication Data

US 2002/0172401 A1 Nov. 21, 2002

(51) Int. Cl.[7] .................................................. G06K 9/00
(52) U.S. Cl. .................................... 382/154; 367/9
(58) Field of Search ............................. 382/109, 154; 73/152.01; 348/85; 356/12, 241.1; 345/419–427; 367/47, 48, 49, 72, 9

(56) References Cited

U.S. PATENT DOCUMENTS

| | | | |
|---|---|---|---|
| 4,467,461 A | 8/1984 | Rice et al. ................. 367/70 |
| 4,751,643 A | 6/1988 | Lorensen et al. ........... 364/414 |
| 4,984,157 A | 1/1991 | Cline et al. ................ 367/413 |
| 5,410,250 A | 4/1995 | Brown ...................... 324/309 |
| 5,455,896 A | 10/1995 | Takamura .................. 345/419 |
| 5,563,949 A | 10/1996 | Bahorich et al. ........... 364/421 |
| 5,574,836 A | 11/1996 | Broemmelsiek ............ 395/127 |
| 5,586,082 A | 12/1996 | Anderson et al. ........... 367/73 |
| 5,659,691 A | 8/1997 | Durward et al. ............ 395/329 |
| 5,759,044 A | 6/1998 | Redmond ................... 434/301 |
| 5,798,982 A | 8/1998 | He et al. ................... 367/73 |
| 5,852,447 A | 12/1998 | Hosoya et al. ............. 345/468 |
| 5,930,730 A | 7/1999 | Marfurt et al. ............. 702/16 |
| 5,966,672 A | 10/1999 | Knupp ...................... 702/16 |
| 6,083,162 A | 7/2000 | Vining ...................... 600/407 |
| 6,144,383 A | 11/2000 | Lichtenbelt et al. ........ 345/419 |

FOREIGN PATENT DOCUMENTS

WO   WO 96/18915   6/1996

OTHER PUBLICATIONS

Compton, Mark, "A Dream Comes True," IRIS Universe #26, Jun., 1997, 3 pages.

Texaco Announces the Opening of New 3–D Visualization Center in Houston, Business Wire, Nov. 11, 1997, 1 page.

Antosh, Nelson, "Oil Now Showing at a Theater Near You," Houston Chronicle, Sep. 19, 1997, 2 pages.

Abstract, "3–D Seismic Visualization<" Emerging Technologies Group, Houston Geological Society, Mar. 1998.

(List continued on next page.)

Primary Examiner—Samir Ahmed
(74) Attorney, Agent, or Firm—Shook, Hardy & Bacon, L.L.P.

(57) ABSTRACT

A method and system are disclosed for creating a combination attribute volume or combo volume by combining one or more attribute volumes into a single volume. For instance, seismic data volumes may be used for creating a combination seismic attribute volume from multiple seismic attribute volumes. This is accomplished by replacing certain of the standard 8-bit data values in a seismic data volume with marker values that denote certain values of other, spatially coincident, seismic attribute data. The resulting combo volume may then be displayed and a seed pick positioned on an event of interest such as a geological body. An auto-picker function or program will then find all the connecting points which will quickly further define the event. The event may then be displayed and interpreted.

18 Claims, 4 Drawing Sheets

OTHER PUBLICATIONS

GeoQuest, IESX Integrated Multisurvey Interpretation Software Product Description Feb. 23, 1996 (printed May 3, 1998) 17 pages.

VoxelGeo Product Description, Paradigm Geophysical, 1996 (printed Mar. 27, 1998), 6 pages.

"CogniSeis Turns Up the Volume with the Latest Release of VoxelGeo," Press Release, Apr. 30, 1997 (printed Mar. 27, 1998), 2 pages.

Peloso, Andy, "Open Vision 4.0," User NEt, May/Jun. 1997 (printed Mar. 27, 1998), 8 pages.

Hutchinson, Suzi, "FZAP !1.0 Offers Automated Fault Picking," UserNet, May/Jun. 1997 (printed Mar. 27, 1998), 5 pages.

Shamban, Adam, et al., "Earth Cube 1.2: New Functinality and Work Flows," UserNet, May/Jun. 1997 (printed Mar. 27,1998), 10 pages.

"GeoQuest at a Glance,"printed May 3, 1998, 3 pages.

"GeoQuest Enhances GeoViz and Voxels for OCTANE." 1997 (printed May 3, 1998), 3 pages.

Kate Thomas, "Oil Buz Gushes Patents," The National Law Journal, Feb. 6, 1998, pp. 1, 26.

G. Alan Petzet, "Interactive 3D Visualization Speeds Well, Reservoir Palanning," Oil and Gas Journal, Nov. 24, 1997, pp. 82–83.

Robert L. Scheier, "Creating a Cash Gusher," Computerworld, Apr. 21, 1997, pp. 76–78.

Michael J. Zeitlin, "Integration Strategy Takes Full Advantage of 3–D Seismic Capapbility," World Oil, May 1995, pp. 59–60.

A.D. Koen, "Tough Economics Remold Production R&D Campaign," Oil & Gas Journal, Jul. 5, 1993, pp. 14–18.

Michael J. Zeitlin, "Visualization Brings a New Dimension to Oil Exploration and Production," Geobyte, Jun. 1992, pp. 36–39.

Rutger Gras, GeoQuest, "Automated 3–D Software Interprets Fault Systems," World Oil, May 1998, pp. 81–83.

Goldman, et al., "The C osmic Worm," IEEE Computer Graphics and Applications, vol. 14, No. 4, pp. 12–14, Jul. 1994.

Eric Pepke, "Animation and the Examination of Behavior Over Time," in Gallagher, R.S. ed. Computer Visualization 1995.

Gatti, C., et al., "An Interactive System for Volume Analysis," in Palamidese, P. Scientific Visualization: Advanced Software Techniques, Ellis Orwood Ltd. New York 1993.

SYSTEM AND METHOD FOR ANALYZING AND IMAGING AND ENHANCED THREE-DIMENSIONAL VOLUME DATA SET USING ONE OR MORE ATTRIBUTES

This application claims the benefit of PCT application Ser. No. PCT/US01/03227 filed on Jan. 31, 2001.

BACKGROUND OF THE INVENTION

1. Field of the Invention

The present invention relates generally to imaging of three-dimensional ("3D") volume data sets. More particularly, the present invention relates to improved imaging and analysis of physical attributes representing events within 3D volume data sets.

2. Related Art

Many fields of endeavor require the analysis and imaging of 3D volume data sets. For example, in the medical field, a computerized axial tomography ("CAT") scanner or a magnetic resonance imaging ("MRI") device is used to produce a picture or diagnostic image of some part of a patient's body. The scanner or MRI device generates a 3D volume data set that needs to be imaged or displayed so that medical personnel can analyze the image and form a diagnosis.

Three-dimensional volume data sets are also used in various fields of endeavor relating to the earth sciences. Seismic sounding is one method for exploring the subsurface geology of the earth. An underground explosion or earthquake excites seismic waves, similar to low frequency sound waves, that travel below the surface of earth and are detected by seismographs. The seismographs record the time of arrival of the seismic waves, both direct and reflected waves. Knowing the time and place of the explosion or earthquake, the time of travel of the waves through the interior can be calculated and used to measure the velocity of the waves in the interior. A similar technique can be used for offshore oil and gas exploration. In offshore exploration, a ship tows a sound source and underwater hydrophones. Low frequency (e.g. 50 Hz) sound waves are generated by, for example, a pneumatic device that works like a balloon burst. The sounds bounce off rock layers below the sea floor and are picked up by the hydrophones. In this manner, subsurface sedimentary structures that trap oil, such as faults, folds, and domes, are "mapped" by the reflected waves. The data is processed to produce 3D volume data sets that include a reflection or seismic amplitude datavalue at specified (x, y, z) locations within a geographic space.

A 3D volume data set is made up of "voxels" or volume elements having x, y, z coordinates. Each voxel has a numeric data value for some measured or calculated physical property, at a given location. A data value may, for instance, be an eight bit data word which may include 256 possible values. Examples of geological data values include amplitude, phase, frequency, and semblance. Different data values are stored in different 3D volume data sets, wherein each 3D volume data set represents a different data value. In order to analyze certain geological structures referred to as "events", information from different 3D volume data sets must be interpreted and then used to analyze different events.

One conventional method of displaying multiple 3D volume data sets requires that the voxels be rescaled in order that the data values from each 3D volume data set fit within the 256 data value range for color display which causes a reduction in accuracy of each 3D volume data set. Another conventional method displays each 3D volume data set, however, controls the visual display of each 3D volume data set by adjusting transparency.

In an article written by Jack Lees, in March 1999, published in *The Leading Edge,* entitled "Constructing Faults from Seed Picks by Voxel Tracking," two 3D volume data sets, each using only 128 data values of a 256-data value range, are combined in a single display. The display resolution was significantly reduced, thereby limiting the ability to accurately interpret certain events.

Consequently, there is a need in the art for a system and method to visualize one or more 3D volume data sets with improved accuracy and resolution. Those skilled in the art have therefore long sought and will greatly appreciate the present invention which addresses these and other problems. For purposes of describing the present invention, the terms "image" and "visualize" may be interchangeably used.

SUMMARY OF THE INVENTION

It is, therefore, an object of the present invention to provide an improved system and method for visualizing and interpreting multiple 3D volume data sets in a single combined 3D volume data set.

It is another object of the present invention to provide an improved system and method for visualizing and interpreting a single 3D volume data set in a single enhanced 3D volume data set.

It is still another object of the present invention to provide an improved system and method for visualizing and interpreting one or more 3D volume data sets using a base 3D volume data set scaled across 256 points, wherein select data values from the one or more 3D volume data sets may be inserted into the base 3D volume data set without changing the scaling of the base 3D volume data set.

An advantage of the present invention is improved resolution of selected events.

Another advantage of the present invention is the ability to accurately and efficiently display selected data values related to an event from more than two 3D volume data sets.

Yet another advantage of the present invention is the ability to display data values from multiple 3D volume data sets at the same time.

Yet another advantage of the present invention is greater accuracy than transparency displays.

Yet another advantage of the present invention is the ability to focus on key events in lower quality data value ranges.

Yet another advantage of the present invention is the reduction in interpretation cycle time.

These and other objects, features, and advantages of the present invention will become apparent from the drawings, the descriptions given herein, and the appended claims.

Therefore, the present invention provides a system and method for imaging one or more 3D volume data sets for purposes of more accurately and efficiently analyzing and interpreting different selected events. Each 3D volume data set comprises a plurality of voxels wherein each voxel comprises a data value positioned at a 3D location in a respective 3D volume data set. One preferred embodiment includes a method of combining multiple 3D volume data sets by selecting a first 3D volume data set representing a first attribute, selecting a second 3D volume data set representing a second attribute, and rendering an output 3D volume data set by comparing each of the data values in at least one of the first 3D volume data set and the second 3D volume data set with a preselected data value range or criteria. For each data value where the criteria are met, the method further comprises inserting a first selected data value at a position corresponding with the respective data value in the output 3D volume data set. For each data value where the criteria are not met, the method further comprises inserting a second selected data value at a position corresponding with the respective data value in the output 3D volume data set. The method may further comprise displaying at least one section of the output 3D volume data set and selecting a data value by inserting a seed pick in the display for visualizing and interpreting an event.

The first selected data value may be related to the first attribute and the second selected data value may be related to the second attribute. The seed pick is visually positioned at a selected data value using the display of the output 3D volume data set. A computer and software program are preferably used for identifying or "auto-picking" all data values connected to the seed pick having the same or similar data value as the respective seed pick. Thus, the present invention may comprise a program storage device readable by a machine, embodying a program of instructions executable by the machine to ultimately image the output 3D volume data set.

In a preferred embodiment, the first 3D volume data set and the second 3D volume data set each comprise seismic data. The method also permits additional 3D volume data sets to be combined and therefore, may include producing a third 3D volume data set representing a third attribute, and comparing each of the data values therein against a second preselected data value range.

In another embodiment of the present invention, an enhanced 3D volume data set related to one of a plurality of attributes may be used to visualize and interpret different selected events. In this embodiment, the method includes identifying each data value from a 3D volume data set which represents a particular attribute. An enhanced 3D volume data set is then created by selecting a data value range or criteria and comparing each data value with the criteria. If the criteria are met, then the method further comprises inserting a first selected data value at a position corresponding with the respective data value in the enhanced 3D volume data set. If the criteria are not met, then the method comprises leaving the data value unchanged in the enhanced 3D volume data set. Additional steps may include displaying at least a section of the enhanced 3D volume data set, selecting a data value by inserting a seed pick in the display, and auto-picking a plurality of data values connected to the seed pick which have a data value identical to that of the seed pick.

In another embodiment of the present invention, a method is provided for creating a combined 3D volume data set derived from multiple 3D volume data sets. The method comprises selecting a base 3D volume data set wherein the base 3D volume data set may comprise data values having a 3D coordinate and a base dataword. The base dataword may preferably be related to a first attribute. Additionally, the method comprises selecting a second three-dimensional volume data set where the second 3D volume data set may comprise data values having a spatially coincident coordinate with respect to the base 3D volume data set and a second dataword related to a second attribute. The method further comprises rendering a combined 3D volume data set by selecting data values in the second 3D volume data set based on a preselected data value range or criteria. If the criteria are met, then the method further comprises replacing the base dataword at a respective coordinate in the base 3D volume data set with a selected data value related to the second attribute. If the criteria are not met, then the method comprises leaving the base dataword related to the first attribute at the respective coordinate in the base 3D volume data set unchanged. After creating the combined 3D volume data set, the method may further comprise displaying at least a portion of the combined 3D volume data set and positioning a seed pick on an event using the display. In one embodiment of the invention, the event is a geological structure.

Continuing in this manner, additional method steps may include selecting a third 3D volume data set where the third 3D volume data set may include data values having a spatially coincident coordinate with respect to the base 3D volume data set and a third dataword related to a third attribute. The method then comprises rendering a revised combined 3D volume data set by selecting data values in the third 3D volume data set based on a second preselected data value range or criteria. If the second criteria are met, then the method further comprises replacing the base dataword at the respective coordinate in the base 3D volume data set with a second selected data value related to the third attribute. If the second criteria are not met, then the method further comprises leaving the base dataword related to the first attribute at the respective coordinate in the base 3D volume data set unchanged. In a preferred embodiment, the first attribute, the second attribute, and the third attribute are each related to seismic data.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

Overview

Combination volumes ("Combo Volumes") are created by combining one or more attributes into a single combined attribute volume or Combo Volume. In one example related to seismic attributes within a 3D volume data set, this is accomplished by replacing certain data values (typically having 256 possible values in a seismic attribute 3D volume data set) with another data value (such as an 8-bit seismic marker data value) that denotes certain values of other spatially coincident seismic attribute data values. Combo Volumes are especially useful for enhancing the performance of voxel-based autotrackers. Examples highlighting the utility of Combo Volumes for use in interpreting seismic data include seismic amplitude/instantaneous phase Combo Volumes for auto-tracking low amplitude discontinuous events. By events it is meant geobodies, such as geological structures depicted by the seismic data. In another example, seismic amplitude/semblance Combo Volumes may be used for stopping the autotracker at geologic discontinuities such as faults or other geologic boundaries. In yet another example, seismic amplitude/instantaneous frequency Combo Volumes may be used for highlighting particular geologic features as expressed seismically, such as onlap onto a peak event or onlap onto a trough event. Commercial uses for oil and gas exploration and development may include event mapping, model building, multi-attribute displays, and auto-picking enhancement.

SYSTEM DESCRIPTION

Figure 1:
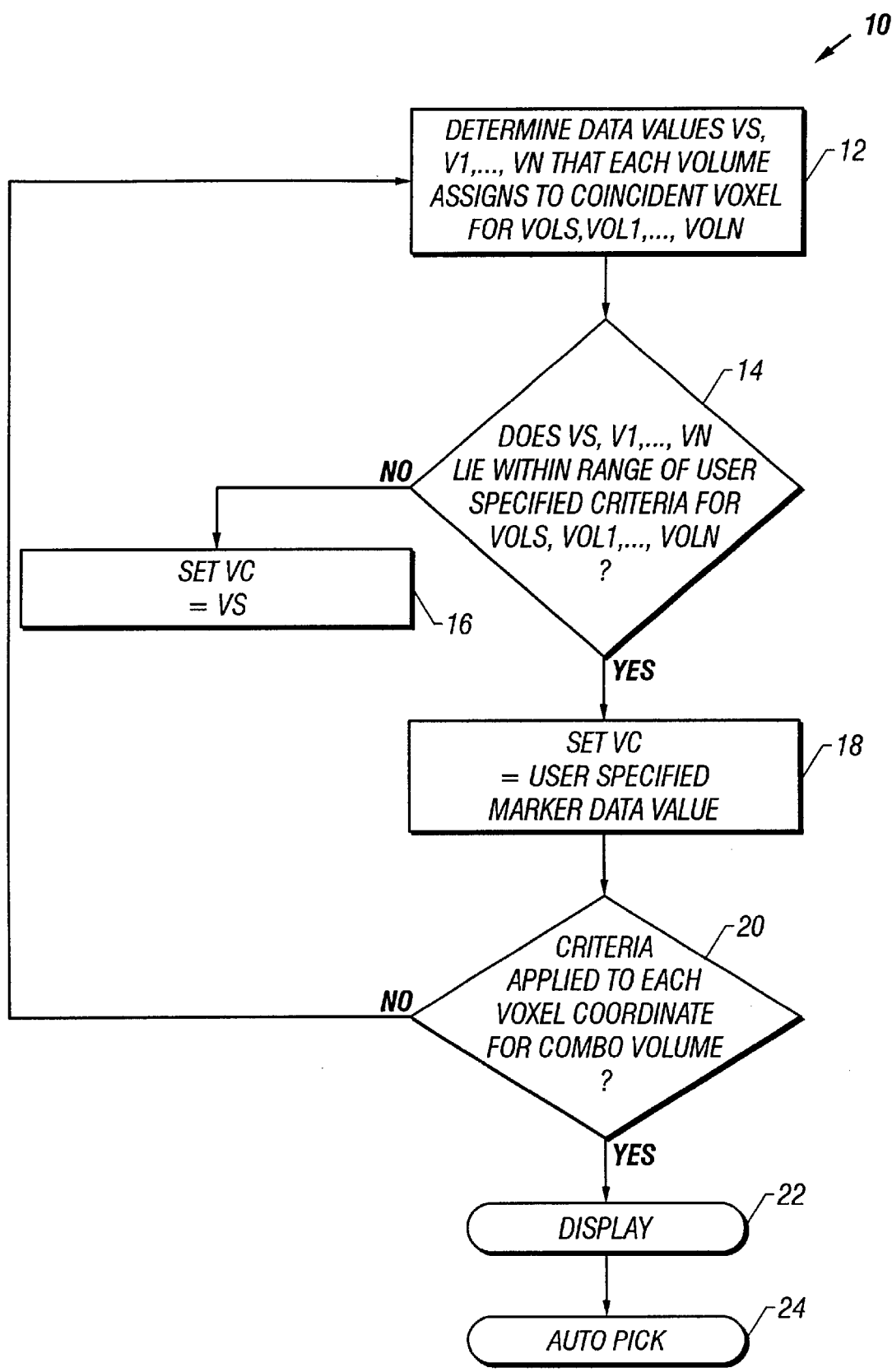
FIG. 1 is a flow diagram illustrating one embodiment for implementing the present invention.

Referring now to FIG. 1, a method 10 in accord with the present invention is illustrated for determining the data values associated with voxels for creating an output volume data set. As known by those of skill in the art, a voxel comprises a 3D coordinate location and a data value, such as a 256-value data word, i.e. an 8-bit word. In step 12, the data values VS, V1, . . . , VN for each spatially coincident volume at the same coordinate or point P are determined where VS may be the data value of an original seismic volume at a point P, V1 may be the data value of attribute volume 1 (VOL 1) at point P, and so forth such that VN is the data value of attribute volume N (VOL N) at point P. The data value of the Combo Volume (VC) at point P is then determined as generally illustrated in steps 14, 16 and 18.

In step 14, it is determined whether VS, V1, . . . , VN lie within user-specified criteria; for instance, whether these data values are within a user-specified range of data values which may be selected for each of VOL S, VOL 1, . . . , VOL N. As illustrated in step 16, if VS, V1, . . . , VN do not lie within the criteria, then the data value of VC is set; for instance, to the same data value as VS at point P. Other user-specified data values can be used, or data values taken from any of the 3D volume data sets at the respective point P could be used. As shown in step 18, if VS, V1, . . . , VN lie within the criteria, then the data value of VC is set at a user-specified marker data value that is related to one of the attribute volumes VS, V1, . . . , VN. As indicated in step 20, the criteria are then applied to each point P, i.e., each voxel for the Combo Volume to be produced. Once this reiterative process is complete, a section, slice or other view of the Combo Volume may be displayed as indicated by step 22. A seed pick may then be chosen from a visually discernable event and the voxels connected thereto having the same data value as the seed pick will be automatically identified as indicated by the "auto-pick" process in step 24. This method quickly and accurately defines the extent of an event such as a geological structure. The extent of the event could then be displayed for analysis and interpretation.

One embodiment of a Combo Volume used for enhancing the ability to autotrack or auto-pick sub-surface salt boundaries utilizes three 3D volume data sets, each representing a different attribute such as instantaneous frequency, seismic amplitude and instantaneous amplitude. This embodiment of a Combo Volume used to detect and display salt boundaries may be configured using conventional methods to determine the instantaneous amplitude attribute (IA) of the seismic amplitude data (SA) and the instantaneous frequency of the instantaneous amplitude attribute (IFIA). Accordingly, a new salt detection (SD) Combo Volume may be configured as follows:

If $f1 \leq IFIA(x, y, z) \leq f2$ AND $a1 \leq SA(x, y, z) \leq a2$,

THEN $SD(x, y, z)=v1$,

ELSE $SD(x, y, z)=IA(x, y, z)$.

The values of f1, f2, a1, a2, and v1 are user selected.

Another embodiment of a Combo Volume consisting of seismic amplitude data and instantaneous phase data can be constructed to enhance the ability to autotrack another seismic event. The instantaneous phase data is derived from the seismic amplitude data using conventional methods. The result is a 3D volume data set having instantaneous phase data values corresponding to each seismic amplitude data value or voxel. At each and every voxel, the instantaneous phase data value is compared to a user-specified data value or criteria. If the instantaneous phase data value satisfies the criteria, then that data value is replaced in the new Combo Volume with a user-specified marker data value. If the instantaneous phase data value does not satisfy the criteria, then that data value in the new Combo Volume is replaced with the corresponding sample data value from the 3D volume data set representing seismic amplitude.

More than two 3D volume data sets can be used, and constraints set for each one, considering spatially coincident data volumes $A(x, y, z)$, $B(x, y, z)$, and $C(x, y, z)$, wherein data volume $D(x, y, z)$ is configured as follows:

IF $a1 \leq A(x, y, z) \leq a2$ AND/OR $b1 \leq B(x, y, z) \leq b2$ AND/or $c1 \leq C(x, y, z) \leq c2$, THEN $D(x, y, z)$=some specific user selected data value, ELSE $D(x, y, z)$=another value.

Figure 2:
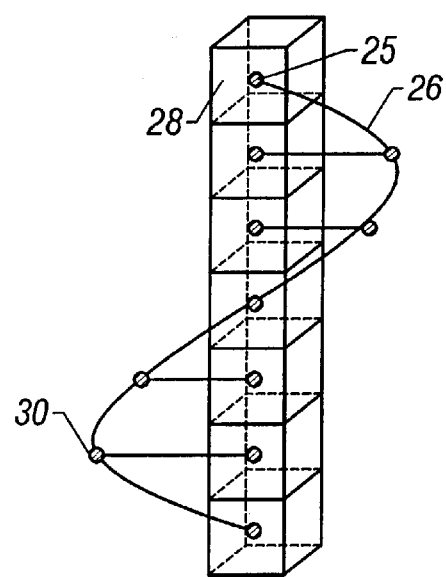
FIG. 2 is a schematic view illustrating the relationship between a typical seismic trace and a data value or voxel.

Referring now to FIG. 2, the relationship between a typical seismic trace 26 and a plurality of voxels 28 is shown. A sample data value rate 30 is measured at a predetermined interval along seismic trace 26. The voxels 28 are a 3D representation or box around samples 25 of seismic trace 26. For seismic data purposes, the voxel may typically have 256 possible data values which may be labeled 0 to 255 or −128 to 127, or a data value range determined by the type of data being used. The measured data values for any 3D volume data set are divided between voxels 28.

Figure 3:
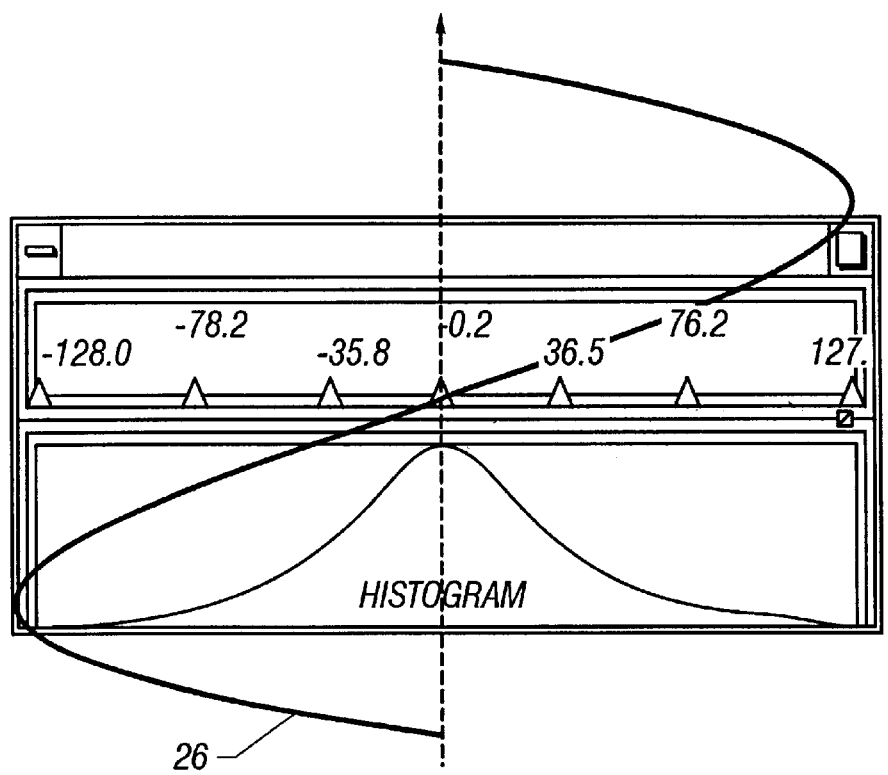
FIG. 3 is a schematic view illustrating an example of seismic amplitude data values given a range between −128 and 127 (an eight bit data value) with an associated data value histogram.

FIG. 3 illustrates an example of seismic amplitude data values given the range −128 to 127 with an associated data histogram.

Figure 4:
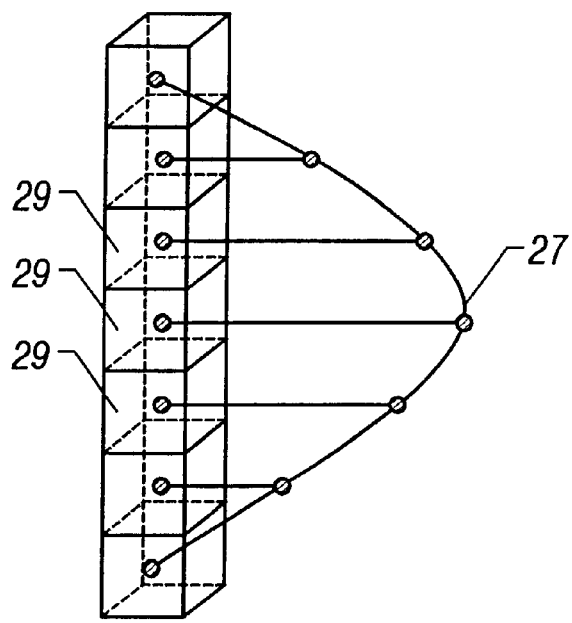
FIG. 4 is a schematic view illustrating the relationship between a peak (a positive phase) event and corresponding data values.

FIG. 4 illustrates the relationship between a peak (positive phase) event 27 and the associated voxels 29.

Another embodiment of the present invention involves creation of an enhanced 3D volume data set. The enhanced 3D volume data set is used to enhance the ability of the autotracker to create surfaces, events an/or geobodies. While this method can be applied to any type of 3D volume data set, seismic phase data values are used in reference to the following description. The enhanced 3D volume data set combines certain of the 256 data values in an 8-bit seismic data volume with marker values that are associated with such certain data values.

Figure 5:
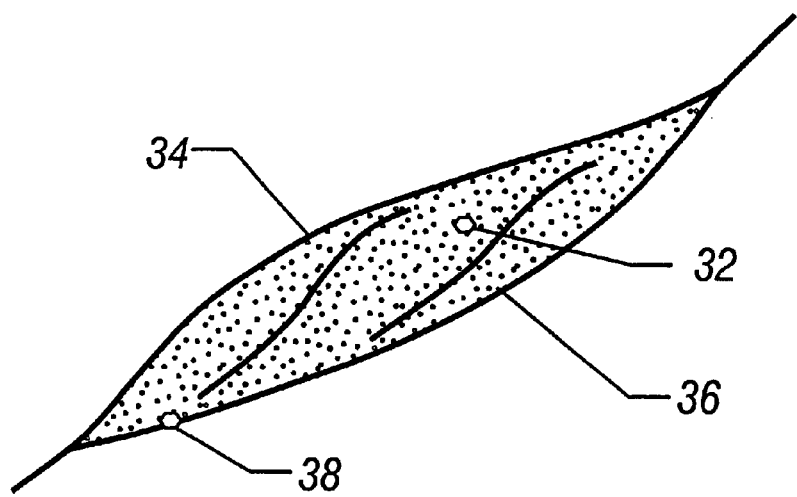
FIG. 5 is a schematic view illustrating seed picks for auto picking all connected points within a defined data value range.
Figure 6:
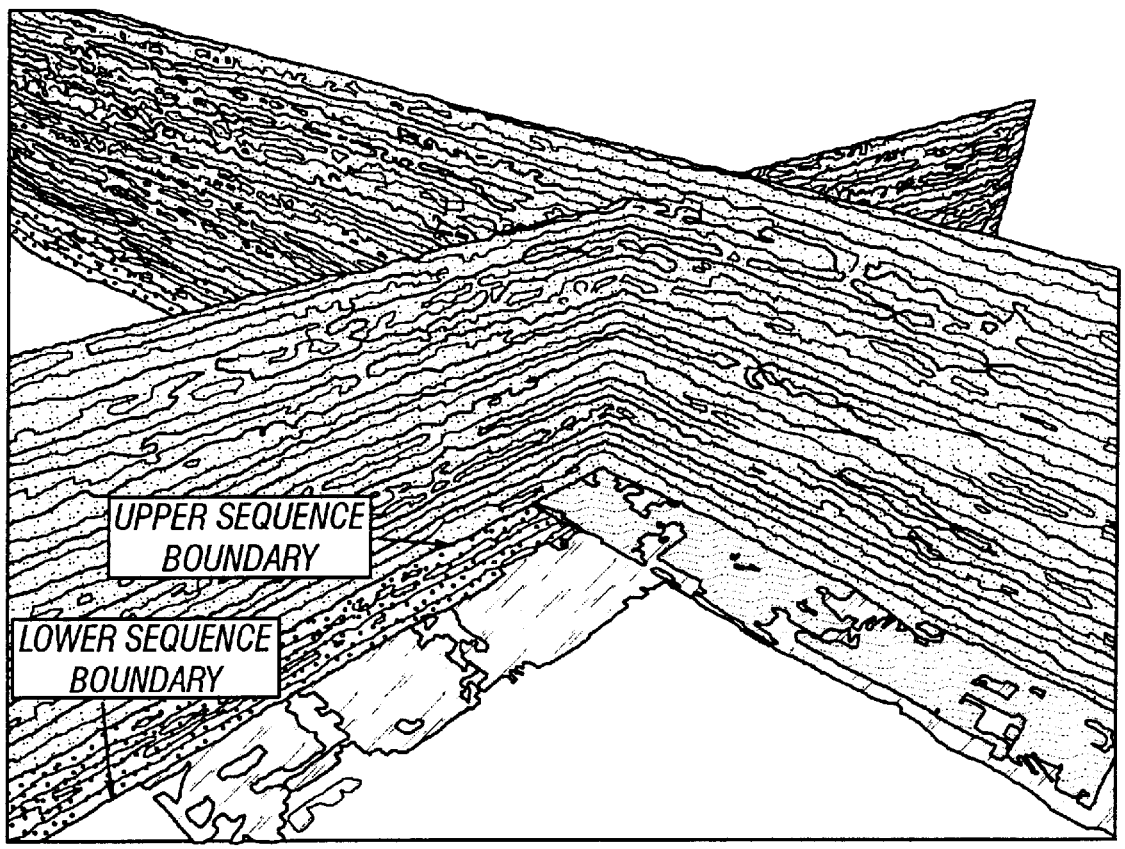
FIG. 6 is a schematic view illustrating a resulting geobody outlined by the auto-pick process.

In order to create an enhanced 3D volume data set representing seismic phase, a range of data values is selected around the maximum peak phase data value. For instance, when using a peak data value scale from 0 to 255, where a peak would be a data value of 127, a potential range might be from about 115 to 139. All voxels in the 3D volume data set would be tested and any voxels having a data value in this range may be redefined with a user-selected data value such as 127. As illustrated in FIG. 5, a seed pick 32 pick may then be visually positioned within a selected event. A computer generated process may then identify or auto-pick, and display any point 38 connected to the seed pick 32 within a range defined by an upper boundary 34 and a lower boundary 36 that would either include or exclude that data value as more particularly illustrated in FIG. 5 which outlines a geobody formed as a result of the seed pick and auto-pick processes applied to an enhanced seismic phase 3D volume data set.

In another embodiment, a Combo Volume is derived from more than one 3D volume data set. It is important to note that the method of the present invention can be applied using any combination of 3D volume data sets, but for explanation purposes a seismic example is provided using a combination of seismic attribute, seismic phase and seismic amplitude data volumes. A base 3D volume data set is selected. The base 3D volume data set will retain its histogram distribution across the amplitude range (−128 to 127) as shown for example in FIG. 3. On a scale of 0 to 255, 0 would be a −128 trough and 255 would be a 127 peak. A second 3D volume data set is selected from which to choose key voxels to combine with the base 3D volume data set.

In this embodiment, seismic phase data is used in reference to the following description. A range of data values is selected around the maximum peak seismic phase data value. When using a peak data value scale from 0 to 255, where a peak would be a data value of 127, a potential range might be from about 115 to 139. All voxels within this range would be redefined with a data value of 127 (maximum peak) or 255 on a scale 0 to 255. The resulting Combo Volume would be displayed and a seed pick would then be positioned on the key event. The auto-picker process would then find all the connected points as described in reference to FIG. 5.

Figure 7:
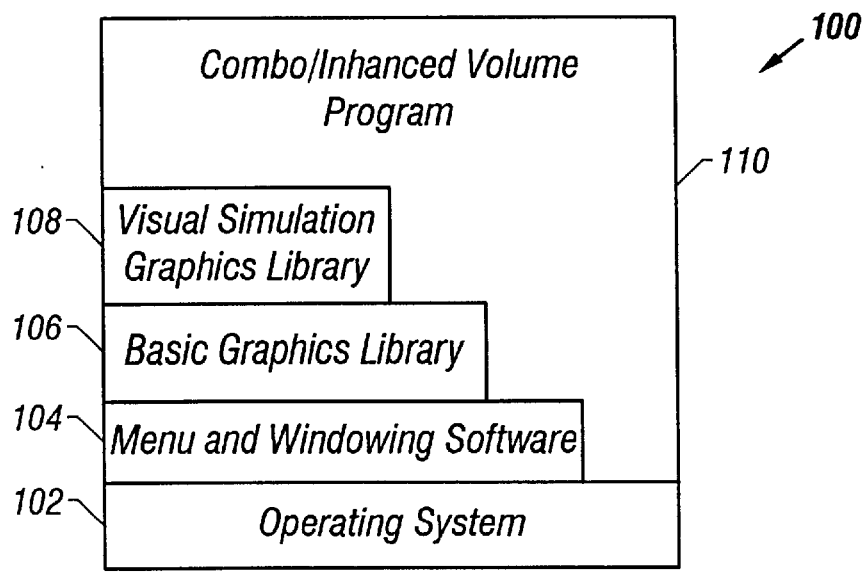
FIG. 7 illustrates one embodiment of a software program or system architecture for implementing the present invention.

The present invention may be implemented using hardware, software or a combination thereof, and may be implemented in a computer system or other processing system. One embodiment of a software or program structure 100 for implementing the present invention is shown in FIG. 7. At the base of program structure 100 is an operating system 102. Suitable operating systems 102 include, for example, the UNIX® operating system, or Windows NT® from Microsoft Corporation, or other operating systems as would be apparent to one of skill in the relevant art.

Menu and windowing software 104 overlays operating system 102. Menu and windowing software 104 are used to provide various menus and windows to facilitate interaction with the user, and to obtain user input and instructions. Menu and windowing software 104 can include, for example, Microsoft Windows™, X Window System™ (registered trademark of Massachusetts Institute of Technology), and MOTIF™ (registered trademark of Open Software Foundation Inc.). As would be readily apparent to one of skill in the relevant art, other menu and windowing software could also be used.

A basic graphics library 106 overlays menu and windowing software 104. Basic graphics library 106 is an application programming interface (API) for 3D computer graphics. The functions performed by basic graphics library 106 include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer.

A particularly preferred basic graphics library 106 is OpenGL®, available from Silicon Graphics, Inc. ("SGI"), Mountain View, Calif. The OpenGL® API is a multi-platform industry standard that is hardware, window, and operating system independent. OpenGL® is designed to be callable from C, C++, FORTRAN, Ada and Java programming languages. OpenGL® performs each of the functions listed above for basic graphics library 106 Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), the entirety of both of which are incorporated herein by reference.

Visual simulation graphics library 108 overlays basic graphics library 106. Visual simulation graphics library 108 is an API for creating real-time, multi-processed 3D visual simulation graphics applications. Visual simulation graphics library 108 provides functions that bundle together graphics library state control functions such as lighting, materials, texture, and transparency. These functions track state and the creation of display lists that can be rendered later.

A particularly preferred visual simulation graphics library 108 is IRIS Performer, available from SGI in Mountain View, Calif. IRIS Performer supports the OpenGL® graphics library discussed above. IRIS Performer includes two main libraries, libpf and libpr, and four associated libraries, libpfdu, libpfdb, libpfui, and libpfutil.

The basis of IRIS Performer is the performance rendering library libpr, a low-level library providing high speed rendering functions based on GeoSets and graphics state control using GeoStates. GeoSets are collections of drawable geometry that group same-type graphics primitives (e.g., triangles or quads) into one data object. The GeoSet contains no geometry itself, only pointers to data arrays and index arrays. Because all the primitives in a GeoSet are of the same type and have the same attributes, rendering of most databases is performed at maximum hardware speed. GeoStates provide graphics state definitions (e.g., texture or material) for GeoSets.

Layered above libpr is libpf, a real-time visual simulation environment providing a high-performance multi-process database rendering system that optimizes use of multiprocessing hardware. The database utility library, libpfdu, provides functions for defining both geometric and appearance attributes of 3D objects, shares state and materials, and generates triangle strips from independent polygonal input. The database library libpfdb uses the facilities of libpfdu, libpf, and libpr to import database files in a number of industry standard database formats. The libpfui is a user interface library that provides building blocks for writing manipulation components for user interfaces (C and C++ programming languages). Finally, the libpfutil is the utility library that provides routines for implementing tasks such as MultiChannel Option support and graphical user interface (GUI) tools.

An application program which uses IRIS Performer and OpenGL® API typically carry out the following steps in preparing for real-time 3D visual simulation:

1. Initialize IRIS Performer;
2. Specify number of graphics pipelines, choose the multiprocessing configuration, and specify hardware mode as needed;

3. Initialize chosen multiprocessing mode;

4. Initialize frame rate and set frame-extend policy;

5. Create, configure, and open windows as required; and

6. Create and configure display channels as required.

Once the application program has created a graphical rendering environment by carrying out steps 1 through 6 above, then the application program typically iterates through a main simulation loop once per frame.

7. Compute dynamics, update model matrices, etc.;

8. Delay until the next frame time;

9. Perform latency critical viewpoint updates; and

10. Draw a frame.

A combo/enhanced volume program 110 of the present inventions overlays visual simulation graphics library 108. Program 110 interacts with, and uses the functions carried out by, each of visual simulation and graphics library 108, basic graphics library 106, menu and windowing software 104, and operating system 102 in a manner known to one of skill in the relevant art.

Program 110 of the present invention is preferably written in an object oriented programming language to allow the creation and use of objects and object functionality. A particularly preferred object oriented programming language is C++.

In one embodiment, program 110 stores the 3D volume data set in a manner well known to one of skill in the relevant art. For example, the format for data volume can consist of two parts, a volume header followed by the body of data that is as long as the size of the data set. The volume header typically contains information, in a prescribed sequence, such as the file path (location) of the data set, size, dimensions in the x, y, and z directions, annotations for the x, y, and z axes, annotations for the datavalue, etc. The body of data is a binary sequence of bytes, one or more bytes per data value, that can be ordered in the following manner. The first byte is the datavalue at volume location (x, y, z)=(0,0,0). The second byte is the datavalue at volume location (1,0,0), the third byte is the datavalue at volume location (2,0,0), etc. When the x dimension is exhausted, then the y dimension is incremented, and finally the z dimension is incremented. The present invention is not limited in any way to a particular data format.

The program 110 facilitates input from a user to identify one or 3D volume data sets to use for imaging and analysis. When a plurality of data volumes is used, the datavalue for each of the plurality of data volumes represents a different physical parameter or attribute for the same geographic space. By way of example, a plurality of data volumes could include a geology volume, a temperature volume, and a water-saturation volume. The voxels in the geology volume can be expressed in the form (x, y, z, seismic amplitude). The voxels in the temperature volume can be expressed in the form (x, y, z, ° C.). The voxels in the water-saturation volume can be expressed in the form (x, y, z, % saturation). The physical or geographic space defined by the voxels in each of these volumes is the same. However, for any specific spatial location $(x_0, y_0, z_0)$, the seismic amplitude would be contained in the geology volume, the temperature in the temperature volume, and the water-saturation in the water-saturation volume.

Conclusion

The foregoing disclosure and description of the invention is illustrative and explanatory thereof, and it will be appreciated by those skilled in the art, that various changes in the size, shape and materials, the use of mechanical equivalents, as well as in the details of the illustrated construction or combinations of features of the various elements may be made without departing from the spirit of the invention.

What is claimed is:

1. A method for combining a plurality of 3D volume data sets in a single output 3D volume data set, each 3D volume data set comprising a plurality of voxels, each voxel comprising a data value and being positioned at a 3D location in a respective 3D volume data set, said method comprising:

selecting a first 3D volume data set representing a first attribute;

selecting a second 3D volume data set representing a second attribute;

comparing each of said data values in at least one of said first 3D volume data set and said second 3D volume data set with a preselected data value range;

inserting a first selected data value at a position corresponding with said respective data value in said output 3D volume data set for each data value within said data value range;

inserting a second selected data value at a position corresponding with said respective data value in said output 3D volume data set for each data value outside said data value range; and displaying at least one section of said output 3D volume data set.

2. The method of claim 1, wherein said first selected data value is related to said first attribute.

3. The method of claim 1, wherein said second selected data value is related to said second attribute.

4. The method of claim 1, further comprising:

inserting a seed pick in said display for determining an event related to a physical phenomena, said seed pick being positioned at a respective data value position using said display.

5. The method of claim 4, further comprising:

auto-picking all data values connected to said seed pick which have the same data value as said respective data value at which said seed pick is positioned.

6. The method of claim 4, wherein said first 3D volume data set and said second 3D volume data set are comprised of seismic data and said event is a geological structure.

7. The method of claim 1, further comprising:

selecting a third 3D volume data set representing a third attribute;

comparing each of said data values in at least one of said first 3D volume data set, said second 3D volume data set, and said third 3D volume data set with said preselected data value range;

inserting said first selected data value at a position corresponding with said respective data value in said output 3D volume data set for each data value within said data value range;

inserting said second selected data value at a position corresponding with said respective data value in said output 3D volume data set for each data value outside said data value range; and displaying at least one section of said output 3D volume data set.

8. A program storage device readable by a machine embodying a program of instructions executable by the machine to perform method steps of imaging an output 3D volume data set, the 3D volume data set including a plurality of voxels, each voxel defined by a 3D coordinate and a data value, the method comprising:

selecting a plurality of spatially coincident 3D volume data sets wherein each of said 3D volume data sets is related to at least one of a corresponding plurality of attributes;

selecting one or more selectable criteria for comparing with data values of one or more of said plurality of spatially coincident data sets;

inserting a first preselected data value at a coordinate corresponding with said respective data value in said output 3D volume data set when said data value meets said one or more selectable criteria; and displaying at least one section of said output 3D volume data set.

9. The program storage device of claim 8, wherein said first preselected data value is related to at least one of said plurality of attributes.

10. The program storage device of claim 9, further comprising:

inserting a second preselected data value at a coordinate corresponding with said respective data value in said output 3D volume data set when said data value meets said one or more selectable criteria.

11. The program storage device of claim 10, wherein said second preselected data value is relaxed to at least another one of said plurality of attributes.

12. The program storage device of claim 8, wherein said plurality of attributes is each related to seismic data.

13. A method for displaying an enhanced 3D volume data set related to one of a plurality of attributes using a 3D volume data set comprising a plurality of voxels, each voxel comprising a data value and being positioned at a 3D location in said 3D volume data set, said method comprising:

selecting each data value within a data value range, said data value range being related to one of said plurality of attributes;

selecting a comparing each selected data value with said criteria;

inserting a preselected data value at a position corresponding with said data value in said enhanced 3D volume data set when said darn value meets said criteria;

inserting said data value at a position corresponding with said respective data value in said enhanced 3D volume data set when said data value does not meet said criteria;

displaying at least a section of said enhanced 3D volume data set;

utilizing said display for inserting a seed pick at a selected event shown in said display; and auto-picking a plurality of data values connected to said seed pick which have a data value identical to said seed pick data value at which said seed pick is positioned for automatically determining an extent of said event.

14. A method for rendering a combo volume derived from a plurality of 3D volume data sets, comprising:

selecting a base 3D volume data set, said base 3D volume data set comprising voxels having a 3D coordinate and a base dataword, said base dataword being related to a first attribute;

selecting a second 3D volume data set, said second 3D volume data set comprising voxels having a spatially coincident coordinate with respect to said base 3D volume data set and a second dataword related to a second attribute;

selecting voxels in said second 3D volume data set based on a first preselected data value range;

rendering said combo volume by replacing said base dataword in said base 3D volume data set with a first preselected data value related to said second attribute when said respective voxel in said second 3D volume data set is within said first preselected data value range; and displaying at least a portion of said combo volume.

15. The method of claim 14, further comprising:

positioning a seed pick on an event using said display, and identifying points connected to said seed pick which have the same dataword as said seed pick.

16. The method of claim 15, wherein said event is a geological structure.

17. The method of claim 14, further comprising:

selecting a third 3D volume data set, said third 3D volume data set comprising voxels having a spatially coincident coordinate with respect to said base 3D volume data set and a third dataword related to a third attribute;

selecting voxels in said third 3D volume data set based on a second preselected data value range;

rendering a revised combo volume by replacing said base dataword in said base 3D volume data set with a second preselected data value related to said third attribute when said respective voxel in said third 3D volume data set is within said second preselected data value range; and displaying at least a portion of said revised combo volume.

18. The method of claim 17, wherein said first attribute, said second attribute, and said third attribute are each related to seismic data.

* * * * *

UNITED STATES PATENT AND TRADEMARK OFFICE
CERTIFICATE OF CORRECTION

PATENT NO. : 6,690,820 B2
DATED : February 10, 2004
INVENTOR(S) : Lees et al.

It is certified that error appears in the above-identified patent and that said Letters Patent is hereby corrected as shown below:

<u>Title page,</u>
Item [*] Notice, the patent term adjustment should read -- 171 days --, not "51 days".

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO.     : 6,690,820 B2  
DATED          : February 10, 2004  
INVENTOR(S)    : Jack Lees and Tatum M. Sheffield It is certified that error appears in the above-identified patent and that said Letters Patent is hereby corrected as shown below:

Title page,  
Item [54], Title, replace "AND IMAGING AND" with -- AND IMAGING AN --

Column 8,  
Line 8, replace "106" with -- 106. --  
Line 30, replace "Calif." with -- California --

Column 11,  
Line 20, replace "relaxed" with -- related --  
Line 33, replace "selecting a comparing" with -- selecting a criteria and comparing --

Signed and Sealed this

Fourth Day of January, 2005

JON W. DUDAS  
*Director of the United States Patent and Trademark Office*

UNITED STATES PATENT AND TRADEMARK OFFICE
CERTIFICATE OF CORRECTION

PATENT NO. : 6,690,820 B2
DATED : February 10, 2004
INVENTOR(S) : Jack Lees et al.

It is certified that error appears in the above-identified patent and that said Letters Patent is hereby corrected as shown below:

Column 11,
Line 38, replace "darn" with -- data --.

Signed and Sealed this

Sixth Day of September, 2005

JON W. DUDAS
*Director of the United States Patent and Trademark Office*